United States Patent [19]

Eschenauer et al.

[11] 4,047,881
[45] Sept. 13, 1977

[54] HEAT RECUPERATOR AND SHROUD FOR RADIANT TUBE BURNER

[75] Inventors: Paul R. Eschenauer, Cleveland Heights; George Main, Garfield Heights, both of Ohio

[73] Assignee: Republic Steel Corporation, Cleveland, Ohio

[21] Appl. No.: 685,287

[22] Filed: May 11, 1976

[51] Int. Cl.² ............................................. F23D 11/44
[52] U.S. Cl. ................................ 431/215; 126/91 A; 431/353
[58] Field of Search ................. 431/353, 11, 215; 126/91 A, 92 AC; 110/97 D

[56] References Cited

U.S. PATENT DOCUMENTS

| | | | |
|---|---|---|---|
| 2,188,133 | 1/1940 | Hepburn | 431/215 X |
| 2,820,447 | 1/1958 | Parker et al. | 126/91 A |
| 3,079,910 | 3/1963 | Bloom et al. | 126/91 A |

Primary Examiner—Edward G. Favors
Attorney, Agent, or Firm—Watts, Hoffmann, Fisher & Heinke Co.

[57] ABSTRACT

A recuperator and burner shroud assembly for use on a radiant tube burner. The recuperator has two concentric tubes, one connected to the outlet of the radiant tube burner and serving as a stack, the other forming a jacket about the stack for carrying a countercurrent flow of air to the burner. The space between the two tubes is closed at the discharge end of the stack by a peripheral seal that permits relative axial movement between the tubes. A conduit carries heated air from the jacket to a burner shroud, which encapsulates the air inlet portion of the burner, and directs the air into the burner in a manner that establishes a swirling or helical path of travel of combustion products through the burner tube.

7 Claims, 5 Drawing Figures

HEAT RECUPERATOR AND SHROUD FOR RADIANT TUBE BURNER

BACKGROUND OF THE INVENTION

1. Field of the Invention

This invention relates to heat recuperating apparatus for radiant tube burners.

2. Prior Art

A radiant tube burner assembly is comprised of a fuel burner and an open ended tube that extends within a furnace or the like and through which the hot products of combustion from the burner flow, causing the tube to radiate heat. The combustion products, after passing through the tube, are discharged outside the heated environment. Such burners find use, for example, in furnaces used for annealing strip steel.

Radiant tube burners are of the negative pressure or indirect control type in which air is drawn into the burner by suction applied at the discharge end of the radiant tube, e.g., by an eductor, or are of the positive pressure or direct control type in which forced air is introduced at the burner and pushes products of combustion through the tube.

Heat recuperation has been used with radiant tube burners (see, e.g., U.S. Pat. No. 2,700,380), but among the disadvantages of presently available systems, are the difficulty in conveniently and inexpensively applying recuperators to existing negative pressure systems, and the complexity and expense of commercially available arrangements.

SUMMARY OF THE INVENTION

The present invention provides for heat recuperation in positive pressure, i.e., forced air, radiant tube burners, and conveniently converts a negative pressure radiant tube burner system lacking heat recuperation to a positive pressure system with heat recuperation. To this end, a heat recuperator that connects directly to the discharge end of a radiant tube, and a burner shroud that attaches to a burner externally of the furnace, are provided, along with a connecting conduit between the two. The heat recuperator is comprised of a central stack for carrying exhaust gases from the radiant tube, and surrounding jacket within which air to the burner is forced countercurrent to the discharge flow. The shroud is of a multipiece construction, capable of being installed around and encapsulating the air inlet of an existing radiant tube burner (e.g., a burner of the type used with negative pressure) and serves to isolate the air input of the burner from the ambient atmosphere so that only the flow of heated air from the recuperator is supplied to the burner and directed into the burner in a controlled direction.

To achieve a simple, yet effective, construction, the recuperator is comprised of a central tube that functions as a stack and through which products of combustion are discharged from the radiant burner, and a larger surrounding tube spaced radially from the central tube to provide a jacket that contains a flow of countercurrent air to the burner. The surrounding tube is sealed adjacent opposite ends of the central tube. An air inlet is provided in the surrounding tube adjacent the discharge end of the stack or central tube, and an air outlet is provided adjacent the inlet end of the stack. The seal between the central and surrounding tubes at the discharge end of the stack, adjacent the air inlet to the jacket, allows relative longitudinal movement between the two tubes occasioned by differential thermal expansion. In the preferred embodiment of the invention, a slidable seal is provided by a radially expansible, heat resistant, ring and gland carried by the surrounding tube.

The shroud is comprised of a housing attachable about the burner structure to seal the air intake of the burner from ambient atmosphere. An air inlet aperture in the shroud receives heated air from the surrounding tube or jacket of the recuperator through the connecting conduit between the shroud and recuperator. Owing to the location of the aperture and the direction imparted to the air flow by the connecting conduit, the combustion products from the burner flow through the radiant tube in a swirling, helical, path that contributes to a controlled burning rate, virtually eliminates hot spots along the radiant tube, enhances flame stability and heat transfer to the tube, and causes more complete combustion.

By virtue of the particular construction and arrangement of the recuperator and shroud, the assembly is inexpensive to manufacture; provides a straightforward, simple, design approach to heat recuperation by providing a single pass, countercurrent flow with simply formed parts; avoids stresses between the stack and jacket-forming walls of the recuperator, which are at different temperatures during operation; is easily installed externally of a furnace without burner modification; readily converts a negative pressure burner into a positive pressure system with helical air flow; and obtains accompanying advantages of direct air control (viz., improved fuel-air ratio control, lower combustion-air blower-power requirements). By virtue of the heat recuperation, lower operating costs or greater heat input is obtained, greater flame stability and more complete combustion is attained, and the radiant tube temperature profile is improved.

The above and other features and advantages of this invention will become more apparent from the detailed description that follows, when considered in connection with the accompanying drawings.

DETAILED DESCRIPTION OF A PREFERRED EMBODIMENT

Figure 1:
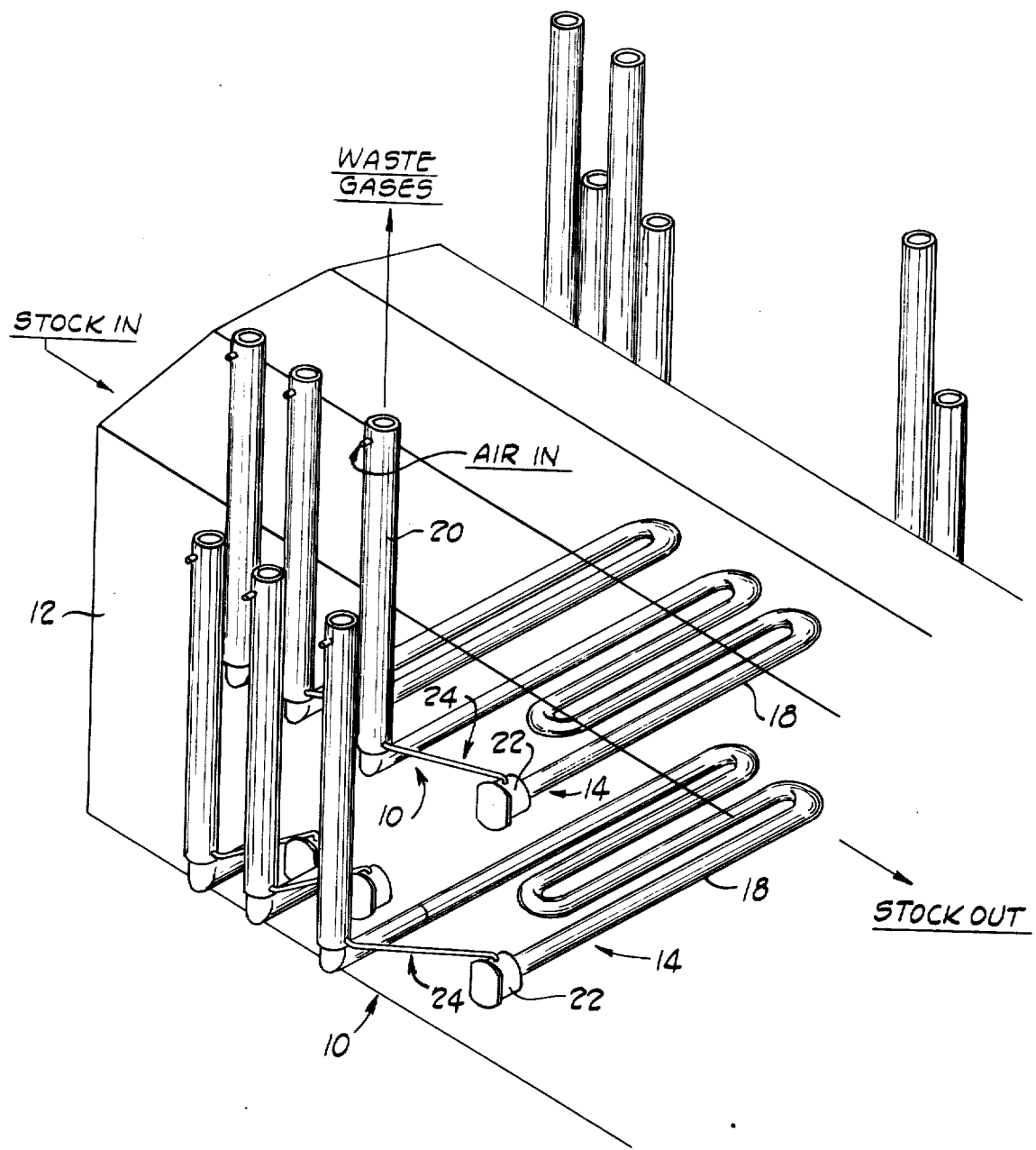
FIG. 1 is a diagrammatic perspective view of a continuous annealing furnace utilizing radiant tube burners with recuperators and burner shrouds embodying the present invention.
Figure 2:
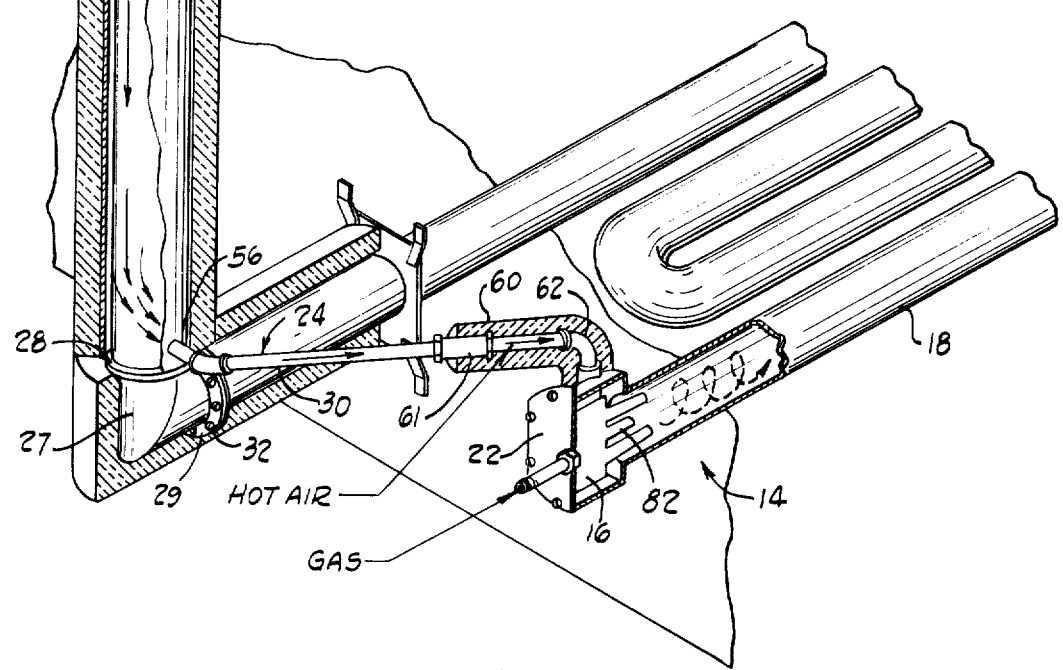
FIG. 2 is a partial perspective view, with parts broken away, illustrating in more detail the construction and arrangement of a recuperator and shroud of FIG. 1.

With reference to the drawings, a recuperator and shroud assembly 10 embodying the present invention is shown in FIG. 1, in use with a continuous annealing furnace 12 of the type used to anneal steel strip. The furnace 12 is heated by radiant tube burners 14 each of which, as best shown in FIG. 2, is comprised of a fuel burner 16 and a connected radiant tube 18 that carries hot products of combustion within the furnace and radiates heat to the product moving through the furnace. A recuperator 20 is connected to the discharge end of each radiant tube 18 and a shroud 22 encapsulates the inlet portion of the fuel burner 16. A conduit 24 carries a flow of heated air from the recuperator 20 to the shroud 22 for supporting combustion of fuel from the burner and for providing pressure to move the hot products of combustion through the radiant tube 18.

In a typical arrangement, as shown in FIG. 1, a plurality of radiant tube burners 14 are above and below the path of work travel, in this case the path of a steel strip. Hot products of combustion from the fuel burners 16 are carried through the tubes 18 which in turn become heated and radiate to the moving strip within the furnace. Heat not liberated by the products of combustion within the furnace is lost if the flow is exhausted directly to the atmosphere. With recuperators 20, part of the heat from the exhaust gas is transferred to incoming air supplied to the burners 16.

Each recuperator 20 is a single pass, countercurrent, recuperator that provides a passage for air introduced under pressure to move in heat-exchange relationship to a stack in which exhaust products flow from an associated radiant tube for discharge to the atmosphere outside the furnace. The recuperator is comprised of a central tube or shell 26 of suitable steel, preferably stainless steel but alternatively carbon steel, which functions as a stack for the exhaust products of combustion. The tube 26 is welded to a right angle elbow 27 at a flange 28. A flange 29 on the opposite end of the elbow connects the elbow to a flanged adaptor 30, as by fasteners such as bolts 32. The flanged adaptor 30 receives the discharge end of a radiant tube 18 adjacent the outside of the furnace wall. A surrounding tube or shell 34 of suitable steel, such as hot rolled carbon steel, extends about the length of the tube 26, from adjacent the discharge end 26a to the elbow flange 28, where the tube 34 is sealed peripherally to the flange 28.

Figure 3:
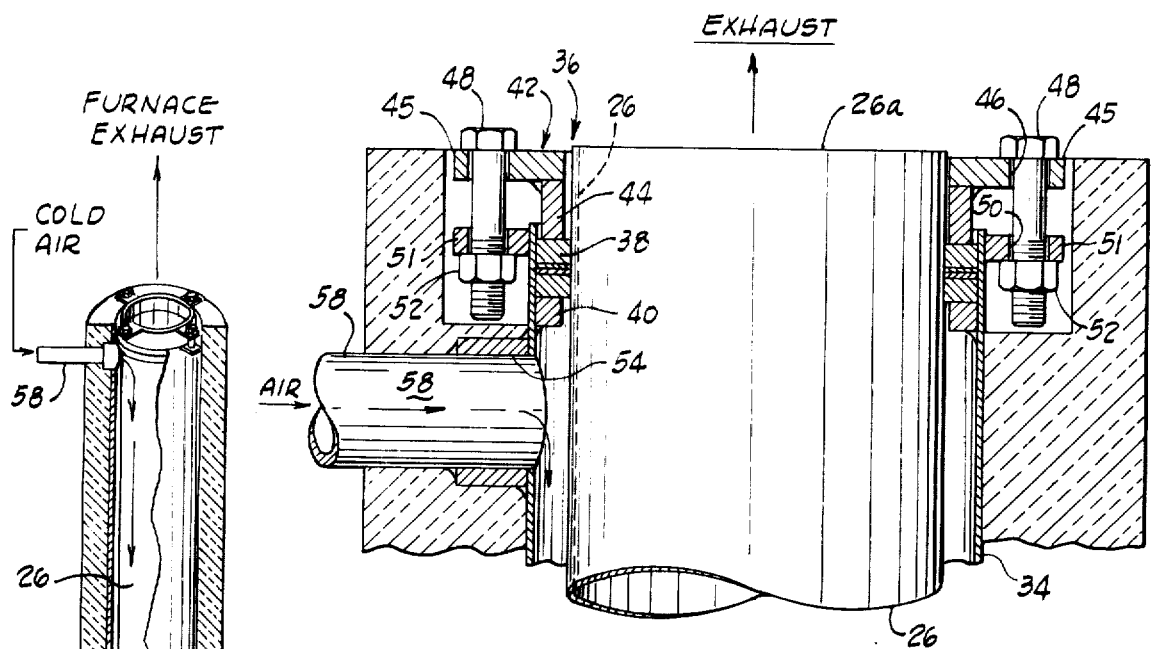
FIG. 3 is a partial sectional view of the discharge end of the recuperator stack of FIG. 2, illustrating the construction of a seal between the central and surrounding tubes of the recuperator.

A peripheral sliding seal, best shown in FIG. 3 and indicated generally by reference numeral 36, is provided at the end 26a of the stack-forming tube 26. The seal closes the annular path between the central and surrounding tubes, while accommodating differential expansion of the tubes due to temperature differences that exist in use. The seal 36 is formed by a ring 38 of compressible, heat resistant, material, such as asbestos. The ring has a width in the radial direction approximately equal to the radial distance between the tubes 26, 34 and has a length in the axial direction approximately twice its width. The ring is carried by a steel ring 40 that is secured, as by welding, to the inside of the outer tube 34. The thickness of the steel ring in the radial direction is less than the width of the gap between the central and surrounding tubes.

A gland 42 is carried at the top of the surrounding tube 34, longitudinally movable relative to the steel ring 40, for compressing the sealing ring 38. The gland is comprised of a sleeve 44 that closely and slidably surrounds the central tube 26, and tabs 45 extending outwardly from the sleeve, with apertures 46. Bolts 48 are carried by the tabs 45, being received in the apertures 46. The bolts also extend through apertures 50 of tabs 51 that extend outwardly from the surrounding tube 34, aligned axially with the tabs 45. Nuts 52 secure the bolts 48 to the tabs 51. By adjusting the bolts, the gland 42 can be moved longitudinally of the tubes 26, 34 to compress the asbestos ring 38 longitudinally, causing radial expansion that effects a seal between the central and surrounding tubes. The seal 36 and the flange 28 at the upper and lower ends, respectively, of the tubes 26, 34, limit the path of incoming air flow through the recuperator.

An inlet 54 is provided in the surrounding tube 34 adjacent the discharge end 26b of the tube 26, just below the sliding seal 36. An outlet 56 is also provided in the surrounding tube 34, just above the seal at the flange 28 of the elbow 27. The inlet 54 receives a conduit 58 from a source of ambient air under positive pressure. The air flows through the space or jacket between the tubes 26, 34 in a direction counter to the flow of exhaust gases in the central tube and becomes heated by virtue of the high temperature of the central tube 26. The heated air is discharged through the outlet 56 into the conduit 24. Both the adaptor 30, the outer tube 34 of the recuperator, and the conduit 24 are covered with pipe insulation 59, 60 to minimize heat loss and, hence, maximize the temperature of the air introduced to the burner.

The conduit 24 of each assembly extends between the outlet aperture 56 and the shroud 22, to conduct heated input air from the recuperator to the burner 16. The conduit 24 includes an expansion joint 61 and couples to the shroud 22 through an elbow 62, which serves to direct the flow of incoming air to the burner in a predetermined path within the shroud.

The shroud 22 is of a size and shape to fit closely around the burner 16, which is outside the wall of the furnace 12. In the embodiment shown, the shroud 22 comprises a cylindrical body portion 66 that fits over and closely envelopes the periphery of the burner 16, covering the air intakes 67. One open end 68 of the body portion forms a close fit with the burner, beyond the air intakes 67. An opposite end of the cylindrical body portion 66 is located adjacent the outer end of the burner and has a peripheral flange 70 against which a cover 72 is secured by fasteners 73, to extend across the end of the cylindrical body. A central opening 74 in the cover 72 allows passage of the fuel line to the burner, and a peep sight 76 is provided in the cover 72 for flame observation.

Figure 4:
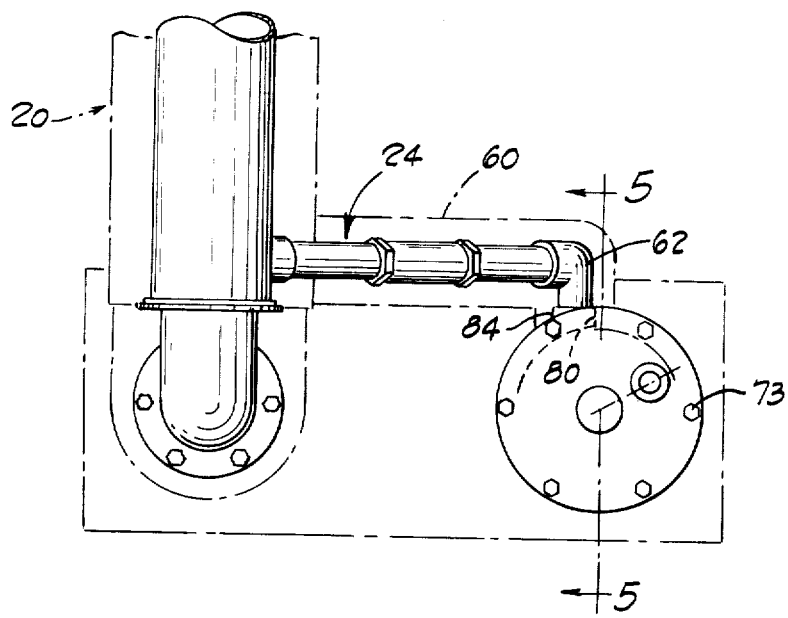
FIG. 4 is a front elevational view of the burner shroud, conduit and portion of the recuperator of FIG. 1.
Figure 5:
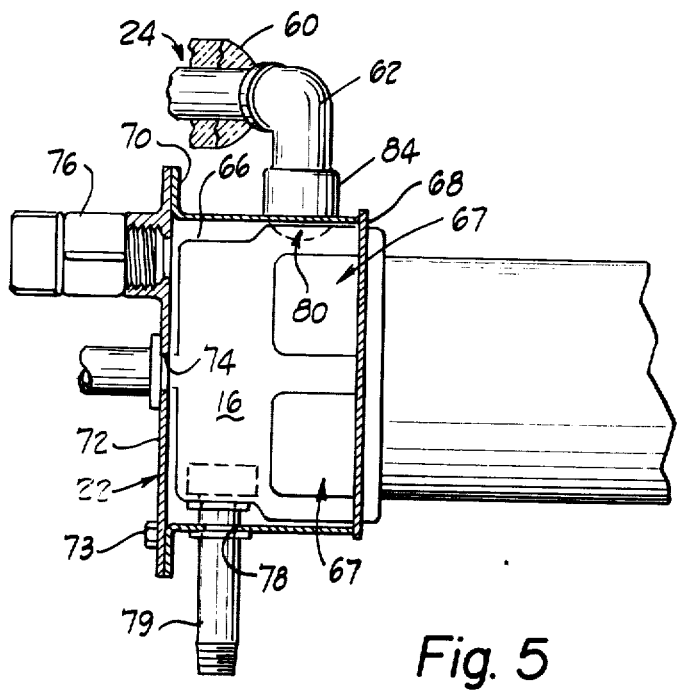
FIG. 5 is a sectional view taken along the line 5—5 of FIG. 4.

The body portion 66 has a peripheral opening 78 and an extending connector 79 for a line to carry a mixture of fuel and air to the burner pilot. A second opening 80 is provided in the body portion 66 for the conduit 24. This opening is located offset from the path along which fuel is injected from the burner nozzle 82 (see FIGS. 2 and 4). A coupling 84 extends from the housing around the second opening, and is connected to the elbow 62 of the conduit 24. The elbow 62 and coupling 84 direct a flow of air from the recuperator in a direction transverse to the flow of fuel from the nozzle 82. This flow of air produces a swirling, helical, flow of combustion products through the radiant tube of the burner.

In the operation of a preferred embodiment constructed as shown and described herein, a recuperator was used having a heat transfer length (the length of the passage formed between the central and surrounding tubes 26, 34) of 74 inches; a central tube diameter of 4.76 inches for the passage of waste gas; and an air annular gap thickness (i.e., the radial distance between the central tube 26 and surrounding tube 34) of 0.375 inch. The burner 16 was operated at a firing rate that utilized 3.2 standard cubic feet per minute (SCFM) of natural gas fuel with an air flow rate of 34.8 SCFM. The waste gas temperature was approximately 1400° F. and the air preheat temperature developed by the recuperator was approximately 700° F. The overall heat transfer coefficient of the recuperator was approximately 4 Btu per min. sq. ft. ° F. The radiant tubes had a length of approximately 194 inches. The radiant tube surface temperature measured at intervals of approximatly 20 inches at distances from 20 to 160 inches from the burner, varied between approximately 1450° and 1700° F. The tube temperature of 1450° F. at a distance of approximately 20 inches from the burner was an increase of approximately 350° F. from the temperature obtained at the same point in the absence of a heat recuperator.

Use of the recuperator and shroud assembly described to convert a negative pressure radiant tube burner to positive pressure operation results in substantial improvement in the operation of the burner. Motive air flow requirements are 40% of those required using an eductor to draw air and combustion products through the same burner. Fuel savings of approximately 20% are achieved over eductor-operated burners without heat recuperation. Of particular advantage is the ease with which the present system can be installed on existing radiant tube burners and its general adaptability for converting negative pressure burners to positive pressure with attainment of the accompanying benefits, including the helical flow within the burner tube imparted by the shroud construction. In addition, the present recuperator, with a long single air pass and adequate insulation, is able to obtain essentially the same preheating of incoming air as preheaters with more than one air pass (i.e., two concentric air jackets or annular paths) but with a simpler, easier to repair, and significantly less expensive, construction.

While a preferred embodiment of the invention has been described in detail, it will be apparent that various modifications or alterations can be made therein without departing from the spirit and scope of the invention claimed.

What is claimed is:

1. A recuperator and shroud assembly for converting a radiant tube burner assembly that is comprised of a burner and a connected radiant tube from indirect air control to direct air control and for providing heat recuperation, comprising: a shroud attachable in surrounding relationhip about the burner, in a manner that encloses an air inlet to the burner, said shroud having an inlet aperture and connected conduit for directing a flow of air under pressure in a direction transversely of, and at a location offset laterally from, the path of fuel flow from the burner and the central longitudinal axis of the adjacent radiant tube portion; a heat recuperator connected to a discharge portion of the radiant tube to receive a flow of hot gas therefrom, said heat recuperator having spaced inner and outer coaxial tubular members, one end of the inner member communicating with the discharge portion of the radiant tube and the other end serving as an exhaust opening, the outer member being sealed at opposite ends about the inner member, one of the ends being sealed in sliding relationship and the other in fixed relationship, an inlet through the outer member adjacent one end, and an outlet adjacent the other end; and means connecting the shroud conduit to said last mentioned outlet.

2. A recuperator for a radiant tube burner, comprising: a central tube forming a passage for the flow of discharge gases from a radiant tube burner, said central tube having an inlet end and a discharge end for said flow; means for connecting the central tube to a discharge end of the radiant tube burner; a surrounding tube spaced from the central tube, forming a passage for an air flow about the central tube counter to the flow of discharge gases; means sealing the surrounding tube to the central tube adjacent opposite ends of each, the seal adjacent the discharge end of the central tube providing for relative longitudinal movement between the two, and including a heat-resistant deformable ring carried by the surrounding tube in sliding contact with the external surface of the central tube, a support on the surrounding tube for said ring, and means carried by said surrounding tube for expanding the ring in a radial direction into sealing relationship with the two tubes; first and second openings in the surrounding tube between the sealing means, the first opening serving as an air inlet and being adjacent the discharge end of the central tube and the second opening serving as an air outlet and being adjacent the inlet end of the central tube; means to facilitate connecting said first opening to an air supply and said second opening to a burner shroud; and a heat-insulating covering about the surrounding tube.

3. A recuperator and shroud assembly for converting radiant tube burners from indirect air control to direct air control and for providing heat recuperation, comprising: a central tube forming a stack for the flow of discharge gases from a radiant tube burner, said tube having an inlet end and a discharge end for said flow; means for connecting the central tube to a discharge end of the radiant tube burner; a surrounding tube spaced from the central tube, forming a passage for an air flow about the central tube counter to the flow of discharge gases; means sealing the surrounding tube to the central tube adjacent opposite ends of each, the seal adjacent the discharge end of the central tube providing for relative longitudinal movement between the two, and including a heat-resistant deformable ring carried by one of the tubes in sliding contact with the other; first and second openings in the surrounding tube between the sealing means, the first opening serving as an air inlet and being adjacent the discharge end of the central tube and the second opening serving as an air outlet and being adjacent the inlet end of the central tube; means connected to said first opening for connecting the opening to an air supply; a shroud forming an enclosure that communicates with air inlet portions of the radiant tube burner; and a conduit communicating between said second opening and the interior of the shroud; said conduit and shroud being constructed and arranged to receive a flow of heated air from the recuperator and produce a helical movement of gases within the radiant tube burner.

4. An assembly as set forth in claim 3 including a support for said ring on the inside surface of the surrounding tube, and means carried by the surrounding tube for expanding the ring in a radial direction into sealing relationship with the two tubes.

5. A recuperator and shroud assembly for converting radiant tube burners from indirect air control to direct air control and for providing heat recuperation, comprising: a straight central tube forming a single pass stack for the flow of discharge gases from a radiant tube burner, said tube having an inlet end and a discharge end for said flow; means for connecting the central tube to a discharge end of the radiant tube burner; a straight surrounding tube spaced from the central tube, forming a passage for air to flow in a single pass about the central tube counter to the flow of discharge gases; means sealing the surrounding tube to the central tube adjacent opposite ends of each, the seal adjacent the discharge end of the central tube providing for relative longitudinal movement between the two, and including a heat-resistant deformable ring carried by the surrounding tube in sliding contact with the external surface of the central tube; first and second openings in the surrounding tube between the sealing means, the first opening serving as an air inlet and being adjacent the discharge end of the central tube and the second opening serving as an air outlet and being adjacent the inlet end of the central tube; means connected to said first opening for connecting the opening to an air supply; a shroud forming an enclosure that communicates with air inlet portions of the radiant tube burner; and a conduit communicating between said second opening and the interior of the shroud; said conduit and shroud being constructed and arranged to receive a flow of heated air from the recuperator and produce a helical movement of gases within the radiant tube burner.

6. An assembly as set forth in claim 5 wherein said shroud has an inlet aperture through which said conduit communicates and the conduit has a portion directly adjacent the aperture that directs a flow of air under pressure in a direction transversely of, and at a location offset laterally from, the path of fuel flow into the radiant burner tube.

7. A recuperator and shroud assembly for converting a radiant tube burner assembly that is comprised of a burner and a connected radiant tube from indirect air control to direct air control and for providing heat recuperation, comprising: a shroud attachable in surrounding relationship about the burner, in a manner that encloses an air inlet to the burner, said shroud having an inlet aperture and connected conduit for directing a flow of air under pressure in a direction transversely of, and at a location offset laterally from, the path of fuel flow from the burner and the central longitudinal axis of the adjacent radiant tube portion; a heat recuperator connected to a discharge portion of the radiant tube to receive a flow of hot gas therefrom, said heat recuperator having spaced inner and outer coaxial tubular members, one end of the inner member communicating with the discharge portion of the radiant tube and the other end serving as an exhaust opening, the outer member being sealed at opposite ends about the inner member, at least one of the ends being sealed in sliding relationship, an inlet through the outer member adjacent one end, an outlet adjacent the other end, a transverse surface extending between the outer and inner members at the ends sealed in sliding relationship, spaced from one and carried by the other, a packing gland secured to the said other member that carries the transverse surface, a heat resistant compressible seal clamped between the transverse surface and the packing gland, in contact with the said one member, and means between the gland and the said other member for adjusting the spacing between the gland and the transverse surface; and means connecting the shroud conduit to said last mentioned outlet.

* * * * *